C. O. GARDINER.
Sickle Bar.

No. 100,392.  Patented March 1, 1870.

Witnesses:

C. O. Gardiner,
Inventor:
by Dodge & Munn
his attys.

United States Patent Office.

CHARLES O. GARDINER, OF SPRINGFIELD, OHIO.

Letters Patent No. 100,392, dated March 1, 1870.

IMPROVEMENT IN SICKLE-BARS.

The Schedule referred to in these Letters Patent and making part of the same

*To all whom it may concern:*

Be it known that I, CHARLES O. GARDINER, of Springfield, in the county of Clark, and State of Ohio, have invented certain new and useful Improvements in Sickle-Bars; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

My invention relates to sickles used in reapers and mowers; and

The invention consists in constructing the head, where it is attached to the pitman, in novel manner, so that the joint can be tightened up as it becomes loose by wear, as hereinafter more fully explained.

In the drawings—

Figure 1:
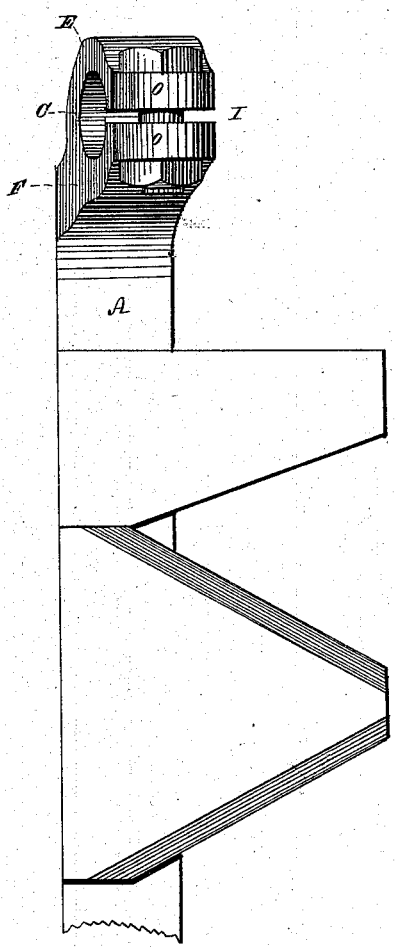
Figure 1 is a top plan view.
Figure 2:
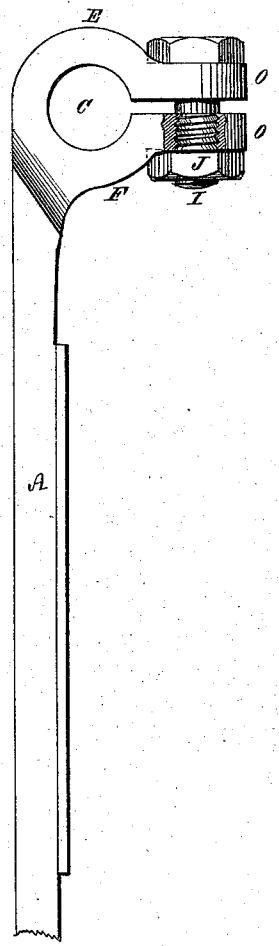
Figure 2 is rear elevation of a portion of the sickle, with my improvement applied thereto.

As is well known, the wear on the joint where the sickle and pitman of reapers or mowers are joined is very great, and many plans have been devised to remedy the evil.

To overcome this difficulty is the object of my invention, and to accomplish it, I construct the head of the bar A with a split or open joint, as represented in the drawings.

The eye C I form of two parts, E and F, each extending about half way round, and terminating in parallel projections or lips O, as shown clearly in fig. 1.

Through these lips O, in line with the bar A, a hole is made to receive a bolt, I, as shown in the drawings.

This bolt I has a screw-thread cut on it, and there is a corresponding thread cut in the lip on the part F, so that by turning the bolt I, the lips O are drawn together more closely, the parts E and F springing sufficiently for that purpose, thus tightening up the eye C on the bolt that unites it to the pitman.

A jamb-nut, J, is then screwed onto the end of bolt I, to prevent the latter from working loose by the jar or vibration of the parts.

If preferred, the thread in the part F may be omitted, and two nuts used instead, and to render the parts still more secure, the inner face of the nut J and the adjoining face of the lip O may both be roughened, to prevent the nut from turning or working loose. These heads may be forged solid on the bar, as a part of it, or they may be made separately and then riveted, welded, or bolted to the bar.

In this latter manner, they can be furnished by the trade to farmers, who can thus apply them to sickles already in use.

Having thus described my invention,

What I claim, is—

A sickle-bar head, constructed with an open joint, in the manner described, so that the joint may be tightened up, to compensate for wear, and prevent rattling, substantially as set forth.

CHARLES O. GARDINER.

Witnesses:
GEO. ARTHUR,
C. G. CROCKER.